United States Patent

DeBoer et al.

[11] Patent Number: 5,902,769
[45] Date of Patent: May 11, 1999

[54] THERMAL IMAGE STABILIZATION BY A REACTIVE PLASTISIZER

[75] Inventors: Charles D. DeBoer, Palmyra; Michael L. Boroson, Rochester; Glenn T. Pearce, Fairport, all of N.Y.

[73] Assignee: Eastman Kodak Company, Rochester, N.Y.

[21] Appl. No.: 08/743,657

[22] Filed: Nov. 5, 1996

[51] Int. Cl.$^6$ .............................. B41M 5/035; B41M 5/38
[52] U.S. Cl. ..................... 503/227; 428/195; 428/913; 428/914
[58] Field of Search ................ 8/471; 428/195, 428/913, 914; 503/227

[56] References Cited

U.S. PATENT DOCUMENTS

| | | | |
|---|---|---|---|
| 4,081,277 | 3/1978 | Brault et al. ............................ | 96/38.2 |
| 4,541,830 | 9/1985 | Hotta et al. .............................. | 8/471 |
| 4,621,271 | 11/1986 | Brownstein ............................. | 346/76 |
| 4,695,286 | 9/1987 | Vanier et al. ............................ | 8/471 |
| 4,695,287 | 9/1987 | Evans et al. ............................ | 8/471 |
| 4,698,651 | 10/1987 | Moore et al. .......................... | 503/227 |
| 4,701,439 | 10/1987 | Weaver et al. ......................... | 503/227 |
| 4,740,797 | 4/1988 | Yamamoto et al. .................... | 346/74.4 |
| 4,743,582 | 5/1988 | Evans et al. ............................ | 503/227 |
| 4,753,922 | 6/1988 | Byers et al. ............................ | 503/227 |
| 4,757,046 | 7/1988 | Byers et al. ............................ | 503/227 |
| 4,775,657 | 10/1988 | Harrison et al. ....................... | 503/227 |
| 4,923,860 | 5/1990 | Simons .................................. | 503/227 |
| 4,947,898 | 8/1990 | Ampe et al. ........................... | 139/452 |
| 4,957,898 | 9/1990 | Weber .................................... | 503/227 |
| 4,962,081 | 10/1990 | Harrison et al. ....................... | 503/227 |
| 4,973,572 | 11/1990 | DeBoer .................................. | 503/227 |
| 4,975,410 | 12/1990 | Weber et al. ........................... | 503/227 |
| 4,988,665 | 1/1991 | Weber et al. ........................... | 503/227 |
| 5,166,126 | 11/1992 | Harrison et al. ....................... | 503/227 |

FOREIGN PATENT DOCUMENTS 2154355  9/1985  United Kingdom ...................... 428/1

*Primary Examiner*—Bruce H. Hess
*Attorney, Agent, or Firm*—Raymond L. Owens

[57] ABSTRACT

A method of stabilizing a thermal image in an image receiving layer, includes: adding a reactive plastisizer which is capable of being cross-linked upon the application of radiation to the image receiving layer; transferring the thermal image to the image receiving layer; and applying radiation to the image receiving layer sufficient to cross-link the plastisizer and thereby stabilize the image.

7 Claims, 1 Drawing Sheet

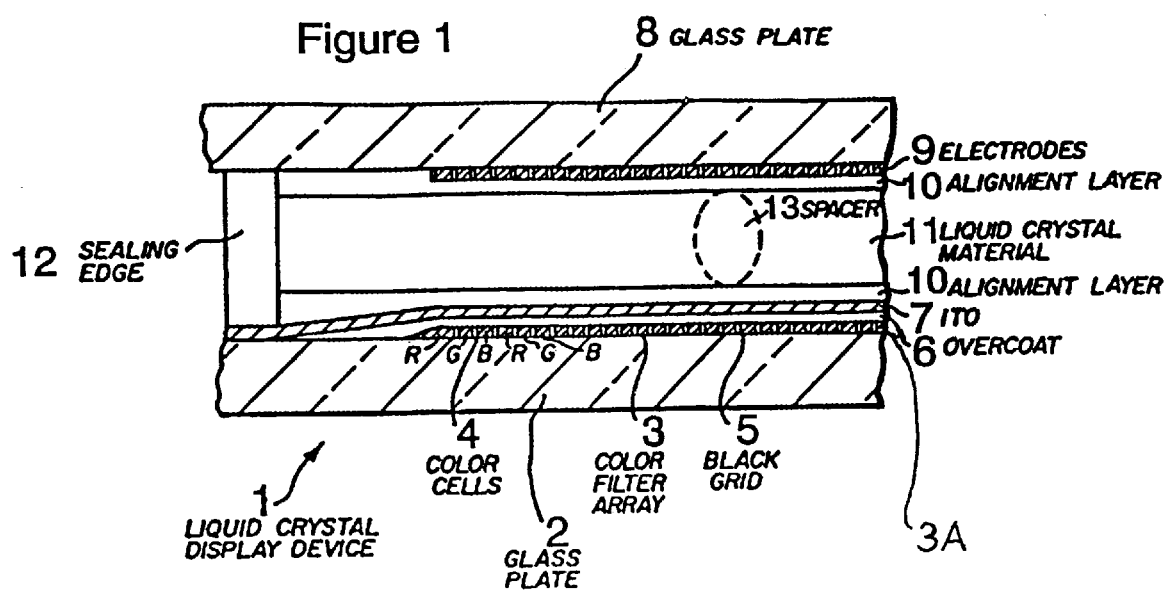

THERMAL IMAGE STABILIZATION BY A REACTIVE PLASTISIZER

FIELD OF THE INVENTION

This invention relates to an image receiving layer method of preparing and stabilizing a hard copy thermal image by means of a reactive plastisizer in such image receiving layer.

BACKGROUND OF THE INVENTION

In recent years, thermal transfer systems have been developed to obtain printed images from pictures which have been generated electronically from a digital record of the original scene. The digital record can be generated directly from an electronic camera such as a video camera, or indirectly, by scanning a photographic print or negative. In essence, a digital photographic record consists of a digital number, or signal, stored on a magnetic or optical medium, that can be converted into an electrical signal whose strength is proportional to the optical density of a given pixel of the image. The digital record may be of one color (monochrome, or black and white), or may consist of records of color separations, commonly as the scene would be viewed through red, green and blue filters. The electrical signals corresponding to the digital record may then be transmitted to a thermal printer. To obtain the print, a cyan, magenta or yellow dye-donor element is placed face-to-face with a dye-receiving element having an image-receiving layer. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271 by Brownstein entitled "Apparatus and Method for Controlling A Thermal Printer Apparatus," issued Nov. 4, 1986.

A common problem with prints made by thermal dye transfer is that of re-transfer from the image-receiving layer, wherein the dyes of the image may diffuse into sheets of paper or plastic which are stored in contact with the thermal prints. This kind of problem can sometimes be seen when a stack of thermal prints is stored; after storage part of the image dyes are found to be transferred to the back of the print above in the stack.

Another kind of thermally printed image, or pattern, is disclosed in U.S. Pat. No. 4,923,860 by Simons entitled "Method of Making a Color Filter Array Using Light Flash," issued May 8, 1990. This patent describes the preparation of a color filter array to be used in a liquid crystal display device.

Liquid crystal display devices are known for digital display in electronic calculators, clocks, household appliances, audio equipment, etc. Liquid crystal displays are being developed to replace cathode ray tube technology for display terminals. Liquid crystal displays occupy a smaller volume than cathode ray tube devices with the same screen area. Also, they are lighter than cathode ray tubes, and are therefore useful in portable device displays such as lap-top computers. In addition, liquid crystal display devices usually have lower power and lower voltage requirements than corresponding cathode ray tube devices.

One commercially available type of color filter array element that has been used in liquid crystal display devices for color display capability is a transparent support having a gelatin layer thereon which contains dyes having the additive primary colors red, green and blue in a mosaic pattern obtained by a photolithographic technique. To prepare such a color filter array element a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. Misalignment or improper deposition of color materials may occur during any of these operations. For a more complete description of this process see in U.S. Pat. No. 4,081,277.

Color liquid crystal display devices generally include two spaced glass panels which define a sealed cavity that is filled with a liquid crystal material. For actively-driven devices, a transparent electrode is formed on one of the glass panels, which electrode may be patterned or not, while individually addressable electrodes are formed on the other of the glass panels. Each of the individual electrodes has a surface area corresponding to the area of one picture element, or pixel. If the device is to have color capability, each pixel must be aligned with a color area, e.g. red, green, or, blue, of a color filter array. Depending on the image to be displayed, one or more of the pixel electrodes is energized during display operation to allow full light, no light, or partial light to be transmitted through the color filter area associated with that pixel. The image perceived by a user is a blending of colors formed by the transmission of light through adjacent color filter areas. In the display of high quality images, it is important that the pixel elements be of pure color, with the correct hue, high saturation of color, and with minimal unwanted absorption of other colors. When dyes are used as the colorants, subsequent processing steps involving heat can cause dye migration, or smearing, which leads to color contamination of adjacent color pixels.

SUMMARY OF THE INVENTION

The object of this invention is to provide a receiver layer for thermal colorants which would both accept the colorant easily during printing and yet stabilize or hold the colorant firmly after printing to prevent retransfer or migration during subsequent heating steps.

An object of this invention is to prepare a thermally printed image with minimal retransfer problems upon storage.

A further object of this invention is to prevent color migration of an image in a color filter array during subsequent heating steps.

These objects are achieved in a method of stabilizing a thermal image in an image receiving layer, comprising the steps of:

(a) adding a reactive plastisizer which is capable of being cross-linked upon the application of radiation to the image receiving layer;

(b) transferring the thermal image to the image receiving layer; and (c) applying radiation to the image receiving layer sufficient to cross-link the plastisizer and thereby stabilize the image.

ADVANTAGES

An advantage of the present invention is that the reactive plastisizer prevents retransfer or migration of a thermal image.

Another advantage is to prevent the smearing of color thermal pixels.

BRIEF DESCRIPTION OF THE DRAWINGS

FIG. 1 is a diagrammatic view of a liquid crystal display which can use the present invention;

DETAILED DESCRIPTION OF THE INVENTION

The present invention is particularly suitable for use in making color filter arrays, although it can be used in other applications.

A useful color filter array should have good thermal resistance, so that subsequent high temperature processing steps such as vacuum sputtering of conducting layers and curing of polymeric alignment layers will not degrade the color quality of the pixel elements of the array. The colorants of the pixel elements of the array should also be chosen to have good fade resistance to the viewing light that illuminates them. The colorants must have good color purity, and the overall transmisivity of the color filter array should be as high as possible, consistent with good color purity and saturation, so that the power of the illuminating lamp need not be excessively high. Additional requirements on the color filter array are that the resolution of the array be high, so that the images appear sharp and detailed to the eye, and the overall uniformity of the image be good.

As noted above, the image receiving layer contains a repeating pattern of colorants, preferably a mosaic pattern.

In a preferred embodiment of the invention, the mosaic pattern consists of a set of red, green, and blue additive primaries.

In another preferred embodiment of the invention, each area of primary color and each set of primary colors are separated from each other by an opaque area, e.g., black grid lines. This has been found to give improved color reproduction and reduce flare in the displayed image.

The size of the mosaic set is not critical since it depends on the viewing distance. In general, the individual pixels of the set are from about 50 to about 600 microns and do not have to be of the same size.

In a preferred embodiment of the invention, the repeating mosaic pattern of colorant to form the color filter array element consists of uniform, square, linear repeating areas, with one color diagonal displacement as follows:

```
R G B R G B
B R G B R G
G B R G B R
```

In another preferred embodiment, the above squares are approximately 100 microns.

The color filter array elements prepared according to the invention can be used in image sensors or in various electro-optical devices such as electroscopic light valves or liquid crystal display devices. Such liquid crystal display devices are described, for example, in U. K. Pats. 2,154,355; 2,130,781; 2,162,674; and 2,161,971.

Liquid crystal display devices are commonly made by placing a material, which is liquid crystalline at the operating temperature of the device, between two transparent electrodes, usually indium tin oxide coated on a substrate such as glass, and exiting the device by applying a voltage across the electrodes. Alignment layers are provided over the transparent electrode layers on both substrates and are treated to orient the liquid crystal molecules in order to introduce a twist of, e.g., 90°, between the substrates. Thus, the plane of polarization of plane polarized light will be rotated in a 90° angle as it passes through the twisted liquid crystal composition from one surface of the cell to the other surface. Application of an electric field between the selected electrodes of the cell causes the twist of the liquid crystal composition to be temporarily removed in the portion of the cell between the selected electrodes. By use of optical polarizers on each side of the cell, polarized light can be passed through the cell or extinguished, depending on whether or not a electric field is applied.

The polymeric alignment layer described above can be any of the materials commonly used in the liquid crystal art. Examples of such materials include polyimides, polyvinyl alcohol, and methyl cellulose.

The transparent conducting layer described above is also conventional in the liquid crystal art. Examples of such materials include indium tin oxide, indium oxide, tin oxide, and cadmium stannate. A preferred material for the transparent conducting layer is indium tin oxide (ITO), which requires high temperature annealing to achieve optimum conductivity.

FIG. 1 shows diagrammatically a part of a liquid crystal display device 1 having a glass plate 2 of glass, quartz, or other suitable material. A color filter array 3 has an image receiving layer 3a in which are formed red (R), green (G), and blue (B) color cells or pixel cells 4 corresponding to pixels. Black grid lines 5 separate each color cell. The image receiving layer 3a includes a reactive plastisizer which will subsequently be described. The color filter array 3 is provided with a polymeric protective overcoat layer 6 and a transparent conducting layer of ITO 7.

In the color filter array of the invention the polymeric protective overcoat layer 6, which overlies the image-receiving layer that contains the colorant of the pixel elements, may be formed by photopolymerizing a layer containing a cycloaliphatic epoxide compound such as 3,4-epoxycylohexylmethyl-3,4-epoxycylohexylcarboxylate, and an onium salt of a Lewis acid as a photoinitiator, as more fully described in U.S. Pat. No. 5,166,126 the disclosure of which is incorporated herein by reference.

The other glass plate 8 has electrodes 9 provided thereon which define pixels, either because the electrodes 9 and the transparent conducting layer of ITO 7 constitute a cross-bar system in which the crosslinks define the pixels (passive drive), or because the electrodes 9 constitute picture electrodes which are driven by a system (now shown) of switching elements, drive, and data lines (active drive), in which case the electrodes 9 may have a single flat structure.

A layer of liquid crystal material 11, which is provided with alignment layers 10, is present between the two supporting glass plates 2 and 8. The two plates are held at a substantially constant distance from each other by means of a sealing edge 12 and spacers 13. In practice, the device is further provided with polarizers, reflectors, etc. in the conventional manner.

The colorants used in the color filter array element of the invention may comprise pigments, dyes, or dichroic layers which are colored by virtue of the interference cancellation of certain wavelengths of light. In a preferred embodiment, the colorants are dyes, more fully described below, and the image-receiving layer may comprise, for example, those polymers described in U.S. Pat. Nos. 4,695,286; 4,740,797; 4,775,657; and 4,962,081, the disclosures of which are hereby incorporated by reference. In a preferred embodiment, polycarbonates having a glass transition temperature greater than about 200° C. are employed. In another preferred embodiment, polycarbonates derived from a methylene substituted bisphenol A such as 4,4'-(hexahydro-4,7-methanoindan-5-ylidene)-bisphenol are employed. In general, good results have been obtained at a coverage of from about 0.25 to about 5 mg/m².

The plastisizer for the dye receiving layer is chosen from the family of thermosetting or photosetting polymeric materials. Such materials are exemplified by epoxide resins, which crosslink when heated with acid. The acid can be incorporated into the polymeric receiving layer, or can be created by an acid forming photosensitizer. Another kind of crosslinker is exemplified by pentaerthrytoltriacrylate, which terminates in three acrylate moities and can crosslink by free radical sensitizers. The level of plastisizer claimed in this invention is between 10% and 50% of the level of the polymer in the image receiving layer.

A dye-donor element that is used to form the color filter array element of a preferred embodiment of the invention comprises a support having thereupon a dye layer. Any dye or mixtures of dyes can be used in such a layer provided they are transferable to the dye image-receiving layer of the color filter array element of the invention by the action of intense light. Especially good results have been obtained with sublimable dyes. Examples of sublimable dyes include anthraquinone dyes, e.g. Sumikalon Violet RS® (Sumito Chemical Co., Ltd.); Dianix Fast Violet 3R-FS® (Mitsubishi Chemical Industries, Ltd.); and Kayalon Polyol Brilliant Blue N-BGM®; Kayalon Polyol Dark Blue 2BM®; and KST Black KR® (Nippon Kayaku Co., Ltd.); Sumickaron Diazo Black 5G® (Mitsui Toatsu Chemicals, Inc.); direct dyes such as Direct Dark Green B® (Mitsubishi Chemical Industries, Ltd.); and Direct Brown M® and Direct Fast Black D® (Nippon Kayaku Co., Ltd.); acid dyes such as Kayanol Milling Cyanine 5R® (Nippon Kayaku Co., Ltd.); basic dyes such as Sumicacryl Blue 6G® (Sumitomo Chemical Co., Ltd.); and Aizen Malachite Green® (Hodogaya Chemical Co., Ltd.); or any of the dyes disclosed in U.S. Pat. Nos. 4,541,830; 4,698,651; 4,695,287; 4,701,439; 4,757,046; 4,743,582; 4,769,360; and 4,753,922, the disclosure of which are hereby incorporated by reference.

Suitable dyes are further illustrated by the following structural formulae:

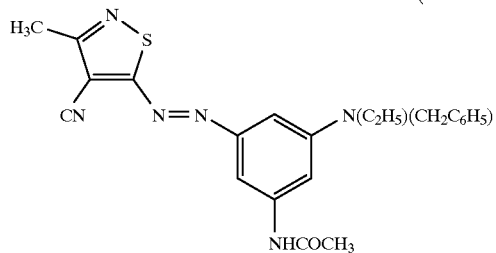
(MAGENTA)

-continued

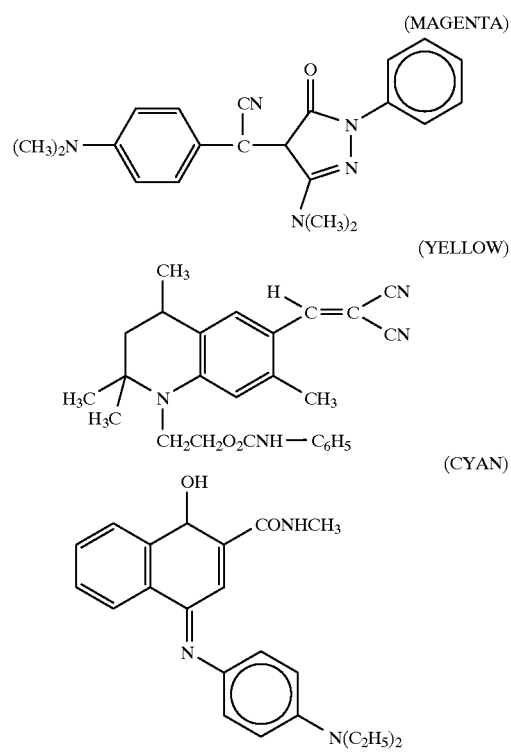

The above subtractive dyes can be employed in various combinations to obtain the desired red, blue, and green additive primary colors, as disclosed in U.S. Pat. Nos. 4,957,898; 4,975,410; and 4,988,665, the disclosures of which are hereby incorporated by reference. The dyes can be mixed within the dye layer or transferred sequentially if coated in separate dye layers and can be used at a coverage of from about 0.05 to about 1 g/m2.

Various methods can be used to transfer dye from the dye donor to the image-receiving layer on the temporary support to form the color filter array element of the invention. For example, a high intensity light flash from a xenon filled flash lamp can be used with a dye-donor containing an energy absorptive material such as carbon black or a light-absorbing dye. This method is more fully described in U.S. Pat. No. 4,923,860, the disclosure of which is incorporated herein by reference.

In another embodiment of the invention, the high intensity light is supplied by means of a laser, using a dye-donor element comprising a support having thereon a dye layer and an absorbing material for the wavelength of the laser. Whichever of these known dye transfer methods is selected for making the color filter array element of the invention, the absorption of the high intensity light causes the dyes to transfer to the receiving layer.

Any material that absorbs the laser energy or high intensity light flash described above can be used as the absorbing material, for example, carbon black or non-volatile infrared-absorbing dyes or pigments which are well known to those skilled in the art. In a preferred embodiment, cyanine infrared absorbing dyes are employed as described in U.S. Pat. No. 4,973,572, the disclosure of which is hereby incorporated by reference.

Irrespective of whether laser or flash lamps are employed to transfer the dye from the donor to the polymeric image-receiving layer, the intensity of the radiation should be high enough and the duration of the flash should be short enough that there is no appreciable heating of the assembly with concomitant significant dimension change in the pattern of color cell or pixel cells 4. In this invention, the preferred duration of flash is from 1 microsecond to 30 milliseconds. The preferred intensity of the flash is from 0.01 Watts per square micrometer to 10 Watts per square micrometer. A reactive plastisizer is material which can be crosslinked to itself in response to radiation.

After the color cell or pixel cell 3 pattern of colorants have been transferred to the dye receiving layer 3a and fused, either by the action of solvent vapor or by soft baking, the layer may be heated or irradiated with ultra-violet radiation to crosslink a reactive plastisizer that has been added to the image receiving layer 3a and stabilize the image-receiving layer 3a.

In a preferred embodiment of the invention, where the reactive plastisizer is 3,4-epoxycylohexylmethyl-3,4-epoxycylohexylcarboxylate and the host polymeric material in the image receiving layer 3a is 4,4'-(hexahydro-4,7-methanoindan-5-ylidene)-bisphenol, the layer may be cured by crosslinking with ultraviolet light by the action of a sensitizer, triphenylsulfonium hexafluoroantimonate. The amount of radiation needed for hardening from a high pressure quartz halogen lamp is from at least about 200 miliJoules per square centimeter to about 2 Joules per square centimeter, and more preferably, from about 1 Joule to about 2 Joules per square centimeter.

In another preferred embodiment of the invention, the ultra violet plastisizer or sensitizer is replaced by an organic acid, and the image receiving layer 3a is cured by heating on a hot plate or in an oven. In a preferred embodiment of the invention the organic acid is p-toluenesulfonic acid, and the dye receiving layer is cured by heating in an over at 150° C. for 20 minutes. In this embodiment of the invention the baking step serves both to fuse the dyes in to the dye receiving layer and to cure the plastisizer; a separate dye fusing step is not needed. The curing bake step is both time and temperature dependent. At lower temperatures and longer cure time is required. At higher temperatures less time is required. In general, starting at 150° C. for 20 minutes, every decrease in temperature of 10° C. will require twice as much cure time to achieve the same cure level.

Examples of a color filter array element that has been prepared in accordance with this invention are described below.

EXAMPLE 1

A 63 mm square of glass, 1.4 mm thick, was spin coated at 2000 rpm with a 15% solution of 4,4'-(hexahydro-4,7-methanoindan-5-ylidene)bisphenol polycarbonate in anisole containing 4.75% 4,4'-(hexahydro-4,7-methanoindan-5-ylidene)-bisphenol and 0.07% p-toluenesulfonic acid monohydrate and allowed to dry while spinning. The glass plate was then placed on a 60° C. hot plate for 30 seconds to complete the drying process. The plate was then placed in contact with a dye donor sheet consisting of a 35 micron thick film of polyethyleneterephthalate overcoated with a mixture consisting of 0.22 g/m2 Yellow dye A of U.S. Pat. No. 4,957,898, incorporated herein by reference; 0.26 g/m2 Magenta dye I of U.S. Pat. No. 4,947,898, incorporated herein by reference; 0.25 g/m2 Raven 1255® carbon, 0.20 g/m2 celluose acetate propionate (2.5% acetyl, 46% propionyl); and 0.008 g/m2 Fluorad FC-431® fluorosurfactant (a product of the 3M Corporation). Then a chrome mask with 130×90 micron holes corresponding to the pixel cells of a color filter array was placed in contact with the back side of the dye donor film, and pressure was applied to hold the assembly firmly in contact. The assembly was exposed to a high intensity xenon flash, and the chrome mask and the dye donor film were removed. The plate was then baked in a 150° oven for 20 minutes to fuse the dyes and crosslink and cure the plastisizer. The optical density of the dyed area was measured with red, green, and blue filters before and after washing the plate with a stream of methanol for 5 seconds while plate was rotating on the spin coater at 2000 rpm. Table 1 shows the optical density loss caused by the methanol wash process.

EXAMPLE 2

The same procedure was used as in Example 1, except the amount of 4,4'-(hexahydro-4,7-methanoindan-5-ylidene)-bisphenol was half that of Example 1. In this example, Table 1 shows that the amount of dye loss upon washing with methanol was slightly higher.

EXAMPLE 3

A 63 mm square of glass, 1.4 mm thick, was spin coated at 2000 rpm with a 15% solution of 4,4'-(hexahydro-4,7-methanoindan-5-ylidene)bisphenol polycarbonate in anisole containing 4.75% DER (a resin derived from bisphenol-A and epichlorohydrin, from the Dow Chemical Company) and 0.07% p-toluenesulfonic acid monohydrate and allowed to dry while spinning. The glass plate was then placed on a 60° hot plate for 30 seconds to complete the drying process. The plate was then placed in contact with a dye donor sheet consisting of a 35 micron thick film of polyethyleneterephthalate overcoated with a mixture consisting of 0.22 g/m2 Yellow dye A of U.S. Pat. No. 4,957,898, incorporated herein by reference; 0.26 g/m2 Magenta dye I of U.S. Pat. No. 4,947,898, incorporated herein by reference; 0.25 g/m2 Raven 1255® (carbon, 0.20 g/m2 celluose acetate propionate (2.5% acetyl, 46% propionyl); and 0.008 g/m2 Fluorad FC-431® fluorosurfactant (a product of the 3M Corporation). Then a chrome mask with 130×90 micron holes corresponding to the pixel cells of a color filter array was placed in contact with the back side of the dye donor film, and pressure was applied to hold the assembly firmly in contact. The assembly was exposed to a high intensity xenon flash, and the chrome mask and the dye donor film were removed. The plate was then baked in a 150° oven for 20 minutes to fuse the dyes and crosslink and cure the plastisizer. The optical density of the dyed area was measured with red, green, and blue filters before and after washing the plate with a stream of methanol for 5 seconds while plate was rotating on the spin coater at 2000 rpm. Table 1 shows the optical density loss caused by the methanol wash process.

EXAMPLE 4

A 63 mm square of glass, 1.4 mm thick, was spin coated at 2000 rpm with a 15% solution of Lexan 141 polycarbonate in anisole containing 4.75% 4,4'(hexahydro-4,7- methanoindan-5-ylidene)-bisphenol and 0.07% p-toluenesulfonic acid monohydrate and allowed to dry while spinning. The glass plate was then placed on a 60° hot plate for 30 seconds to complete the drying process. The plate was then placed in contact with a dye donor sheet consisting of a 35 micron thick film of polyethyleneterephthalate overcoated with a mixture consisting of 0.22 g/m2 Yellow dye A of U.S. Pat. No. 4,957,898, incorporated herein by reference; 0.26 g/m2 Magenta dye I of U.S. Pat. No. 4,947,898, incorporated herein by reference; 0.25 g/m2 Raven 1255® (carbon, 0.20 g/m2 celluose acetate propionate (2.5% acetyl, 46% propionyl); and 0.008 g/m2 Fluorad FC-431® fluorosurfactant (a product of the 3M Corporation). Then a chrome mask with 130×90 micron holes corresponding to the pixel cells of a color filter array was placed in contact with the back side of the dye donor film, and pressure was applied to hold the assembly firmly in contact. The assembly was exposed to a high intensity xenon flash, and the chrome mask and the dye donor film were removed. The plate was then baked in a 150° oven for 20 minutes to fuse the dyes and crosslink and cure the plastisizer. The optical density of the dyed area was measured with red, green, and blue filters before and after washing the plate with a stream of acetone for 5 seconds while plate was rotating on the spin coater at 2000 rpm. Table 1 shows the optical density loss caused by the acetone wash process.

CONTROL 1

A 63 mm square of glass, 1.4 mm thick, was placed in contact with a dye donor sheet as in Example 1. Then a chrome mask with 130×90 micron holes corresponding to the pixel cells of a color filter array was placed in contact with the back side of the dye donor film, and pressure was applied to hold the assembly firmly in contact. The assembly was exposed to a high intensity xenon flash, and the chrome mask and the dye donor film were removed. The plate was then baked in a 150° oven for 20 minutes. The optical density of the dyed area was measured with red, green, and blue filters before and after washing the plate with a stream of methanol for 5 seconds while plate was rotating on the spin coater at 2000 rpm. As Table 1 shows, the methanol wash process caused complete optical density loss of the dyes.

CONTROL 2

This control was done as in Example 1, but with only the polycarbonate 4,4'-(hexahydro-4,7-methanoindan-5-ylidene)bisphenol polycarbonate, and without the epoxy and without the acid. As the data in Table 1 show, the loss of dye upon methanol wash was substantial.

CONTROL 3

This control was done as in Example 4, but without the expoxy and without the acid. As the data in Table 1 show, the loss of dye upon acetone wash was about twice as much as in Example 4.

TABLE 1

| Sample Identification | Optical Filter Used | Percent Density Loss |
|---|---|---|
| Control 1 | Red | 100% |
|  | Green | 100% |
|  | Blue | 100% |
| Control 2 | Red | 6% |
|  | Green | 95% |
|  | Blue | 45% |
| Control 3 | Red | 36% |
|  | Green | 88% |
|  | Blue | 93% |
| Example 1 | Red | 1.3% |
|  | Green | 6% |
|  | Blue | 2.7% |
| Example 2 | Red | 6% |
|  | Green | 7% |
|  | Blue | 7% |
| Example 3 | Red | 1.3% |
|  | Green | 0% |
|  | Blue | 1.6% |
| Example 4 | Red | 36% |
|  | Green | 43% |
|  | Blue | 46% |

The invention has been described in detail with particular reference to certain preferred embodiments thereof, but it will be understood that variations and modifications can be effected within the spirit and scope of the invention.

PARTS LIST 1 liquid crystal display device
2 glass plate
3 color filter array
3a image receiving layer
4 color cells or pixel cells
5 black grid lines
6 polymeric protective overcoat layer
7 ITO
8 glass plate
9 electrodes
10 alignment layer
11 liquid crystal material
12 sealing edge
13 spacers

We claim:

1. A method of stabilizing a thermal image in an image receiving layer, comprising the steps of:
   (a) providing a polymer image receiving layer having a noncrosslinkable polymer,
   (b) adding a reactive plastisizer to the polymer image receiving layer which is capable of being cross-linked upon the application of radiation to the image receiving layer;
   (c) transferring the thermal image to the image receiving layer; and
   (c) transferring the thermal image to the image receiving layer; and
   (d) applying radiation to the image receiving layer sufficient to cross-link the plastisizer and thereby stabilize the image.

2. The method of claim 1 wherein the reactive plastisizer is 3,4-epoxycylohexylmethyl-3,4-epoxycylohexylcarboxylate and host material in the image receiving layer is 4,4'-(hexahydro-4,7-methanoindan-5-ylidene)-bisphenol and the applied radiation is ultraviolet light.

3. The method of claim 2 wherein the radiation is in a range of at least 200 miliJoules/cm$^2$.

4. The method of claim 1 wherein the reactive plastisizer is 3,4-epoxycylohexylmethyl-3,4-epoxycylohexylcarboxylate and host material in the image receiving layer is 4,4'(hexahydro-4,7-methanoindan-5-ylidene)-bisphenol and the applied radiation is ultraviolet light.

5. The method of stabilizing a thermal image in an image receiving layer, comprising the steps of:

(a) providing a polymer image receiving layer having a noncrosslinkable polymer and a reactive plastisizer which is capable of being cross-linked upon acid heating;

(b) adding a soluble acid to the polymer image receiving layer which by acid heating causes cross link of the reactive plasticizer; and (c) transferring colorant into the image receiving layer by heat so that such heat causes the plastisizer to cross link and thereby stabilize the image in the image receiving layer.

6. The method of claim 5 wherein the reactive plastisizer is an organic acid.

7. The method of claim 5 wherein the soluble acid is p-toulenesulfonic acid.

* * * * *